United States Patent
Montero et al.

(10) Patent No.: US 9,779,591 B2
(45) Date of Patent: Oct. 3, 2017

(54) KEYBOARD BACKLIGHT EVENT MESSAGING SYSTEM

(71) Applicant: Dell Products L.P., Round Rock, TX (US)

(72) Inventors: Adolfo S. Montero, Pflugerville, TX (US); Isaac Hsu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 31 days.

(21) Appl. No.: 15/057,917

(22) Filed: Mar. 1, 2016

(65) Prior Publication Data

US 2017/0256143 A1 Sep. 7, 2017

(51) Int. Cl.
| | |
|---|---|
| G08B 3/00 | (2006.01) |
| G06F 3/02 | (2006.01) |
| G08B 5/36 | (2006.01) |
| G06F 9/44 | (2006.01) |
| G06F 11/07 | (2006.01) |
| G09G 5/08 | (2006.01) |
| H03K 17/94 | (2006.01) |

(52) U.S. Cl.
CPC ............ *G08B 5/36* (2013.01); *G06F 3/0219* (2013.01); *G06F 9/4406* (2013.01); *G06F 11/0721* (2013.01); *G06F 11/0784* (2013.01)

(58) Field of Classification Search
CPC ....... G08B 5/36; G06F 3/0219; G06F 9/4406; G06F 11/0721; G06F 11/0784; G02B 6/0068; G02B 6/005
USPC .................. 340/691.1; 345/170, 163; 341/22
See application file for complete search history.

(56) References Cited

U.S. PATENT DOCUMENTS

| | | | | |
|---|---|---|---|---|
| 7,453,441 B1* | 11/2008 | Iorfida | ............... | G06F 3/0237 200/310 |
| 2005/0073446 A1* | 4/2005 | Lazaridis | ............. | G06F 3/0202 341/22 |
| 2006/0158353 A1* | 7/2006 | Tseng | ................... | G06F 3/0202 341/22 |

(Continued)

OTHER PUBLICATIONS

IS31FL3731 ISSI®, Audio Modulated Matrix Led Driver, Apr. 22, 2013, Rev. D., 22 Pages, Integrated Silicon Solution, Inc., www.issi.com.

(Continued)

*Primary Examiner* — Jack K Wang
(74) *Attorney, Agent, or Firm* — Haynes and Boone, LLP

(57) ABSTRACT

A keyboard backlight event messaging system includes a backlit keyboard that includes a plurality of keys and a plurality of light emitting subsystems. Each respective light emitting subsystem of the plurality of light emitting subsystems is configured to backlight a respective key of the plurality of keys. The keyboard backlight event messaging system also includes a computing system that is coupled to the backlit keyboard. The computing system includes a controller that is coupled to the backlit keyboard and that is configured, in response to an event occurring in the computing system, to receive event messaging information that is associated with the event and activate a subset of the plurality of light emitting subsystems according to an event messaging sequence defined by the event messaging information in order to backlight a respective subset of the plurality of keys to provide an event message.

20 Claims, 6 Drawing Sheets

(56) References Cited

U.S. PATENT DOCUMENTS

| | | | | |
|---|---|---|---|---|
| 2006/0227085 | A1* | 10/2006 | Boldt | G09G 3/32 |
| | | | | 345/83 |
| 2008/0001787 | A1* | 1/2008 | Smith | G06F 3/0238 |
| | | | | 341/23 |
| 2010/0302169 | A1* | 12/2010 | Pance | G06F 3/0237 |
| | | | | 345/170 |
| 2010/0306683 | A1* | 12/2010 | Pance | G06F 3/0237 |
| | | | | 715/764 |
| 2012/0013490 | A1* | 1/2012 | Pance | G06F 3/0202 |
| | | | | 341/28 |
| 2012/0235912 | A1* | 9/2012 | Laubach | G06F 3/04895 |
| | | | | 345/163 |
| 2014/0118263 | A1* | 5/2014 | Tajima | G06F 9/4443 |
| | | | | 345/168 |
| 2016/0041329 | A1* | 2/2016 | Lin | G02B 6/0068 |
| | | | | 362/97.1 |

OTHER PUBLICATIONS

KL26 Sub-Family Reference Manual, Oct. 2013, KL26P121M48SF4RM, Rev. 3.2, 876 Pages, Freescale Semiconductor, Inc.

* cited by examiner

KEYBOARD BACKLIGHT EVENT MESSAGING SYSTEM

BACKGROUND

The present disclosure relates generally to information handling systems, and more particularly to providing event messages with a backlit keyboard used with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as computing systems (e.g., personal computers and servers) include a basic input/output system (BIOS) that provides firmware that is used to perform hardware initialization during the booting process of the computing system and that is the first software that is run upon startup of that computing system. Computing systems also may include an embedded controller that performs various system tasks that are not handled by an operating system of the computing system. During a booting process of the computing system, events such as errors, warnings, system status, and/or other computing system events known in the art may occur while the BIOS and/or embedded controller are running. In many situations, the computing system does not include a dedicated display device (e.g., a liquid crystal display (LCD) device or other video display) that the BIOS and/or the embedded controller may use to communicate to a user the events that are taking place during startup or that occur before a display device is initialized (e.g., via BIOS-generated graphical user interface messaging.) Rather, in such situations, the BIOS and/or embedded controller must rely on diagnostic codes that allow the event to be communicated to the user of the computing system by activating and deactivating a light indicator such as a light emitting diode (LED) to provide a "blink pattern". The user of the computing system must then record that blink pattern and rely on some documentation in order to decode the meaning of the blink pattern. As such, dealing with event codes provided through a light indicator is a manual, time-consuming process, which may cause those event codes to be ignored entirely, resulting in system issues that could have been prevented if addressed when the event was communicated.

Accordingly, it would be desirable to provide an improved event messaging system.

SUMMARY

According to one embodiment, an Information Handling System (IHS) includes a chassis; a keyboard connector that is located on the chassis and that is configured to couple to a backlit keyboard that includes: a plurality of keys; and a plurality of light emitting subsystems, where each respective light emitting subsystem of the plurality of light emitting subsystems is configured to backlight a respective key of the plurality of keys; and a controller that is coupled to the keyboard connector and that is configured to: receive event messaging information that is associated with an event; and provide an instruction through the keyboard connector that is configured to activate a subset of a plurality of light emitting subsystems according to an event messaging sequence defined by the event messaging information in order to backlight a respective subset of the plurality of keys to provide an event message.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
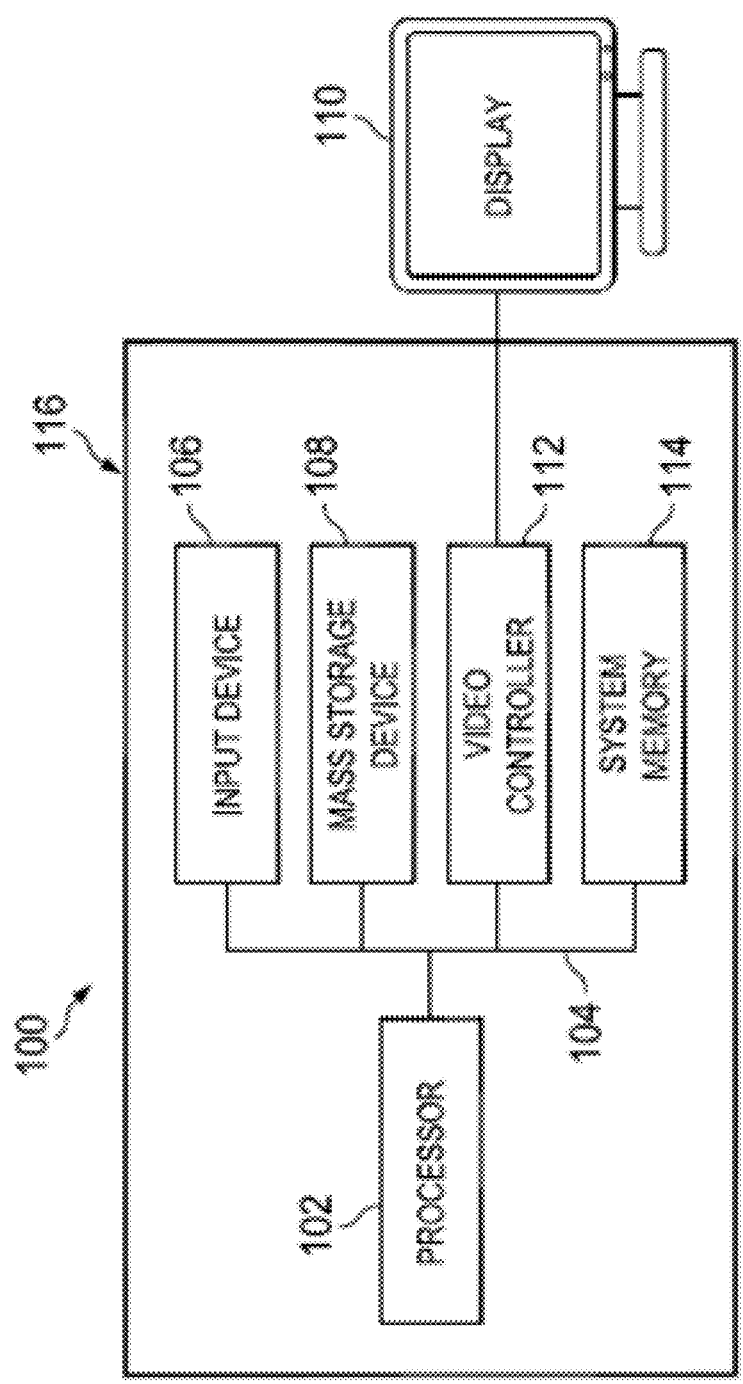
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits may be deployed between the components described above and processor 102 to facilitate interconnection between the components and the processor 102.

Figure 2:
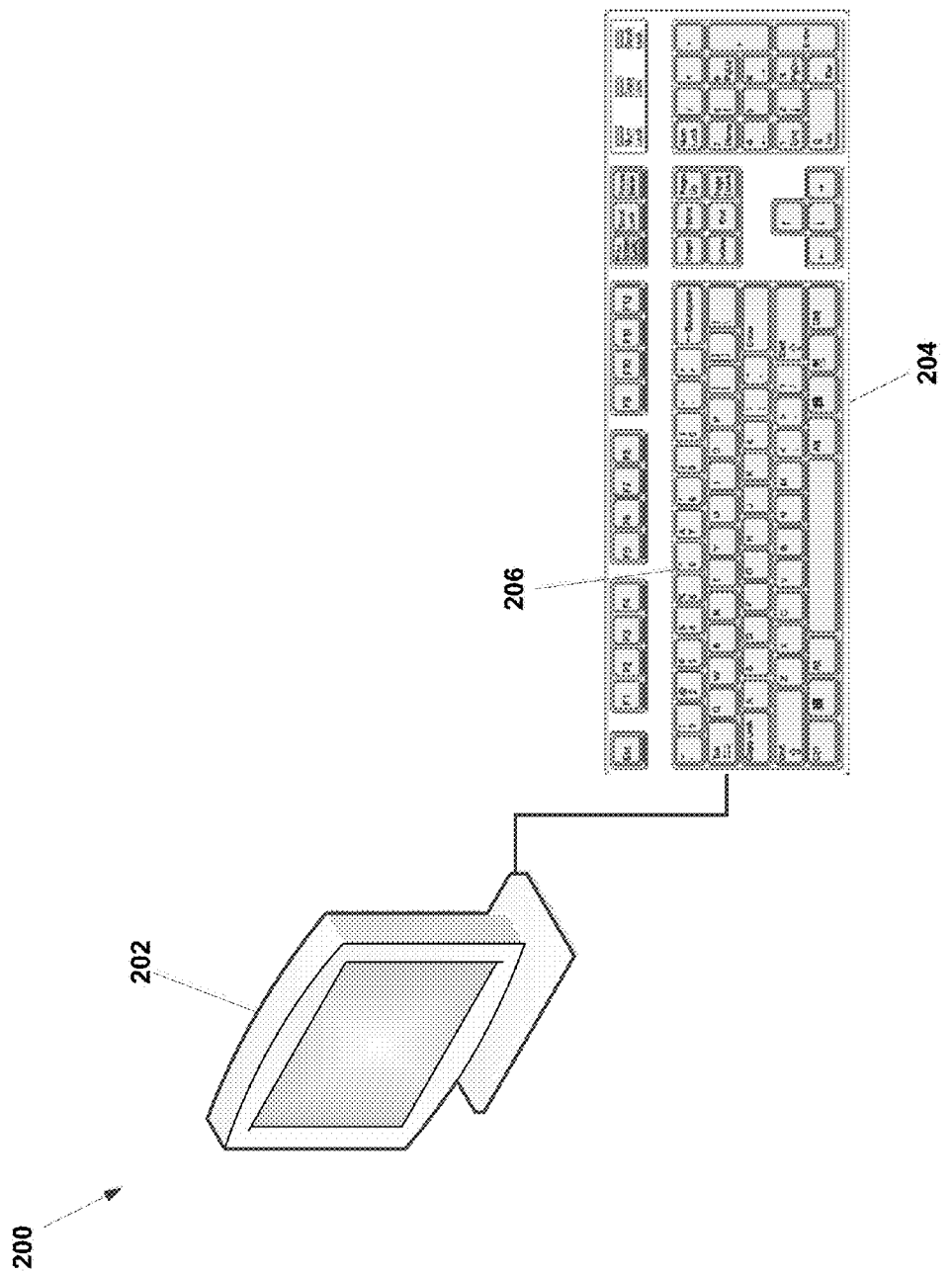
FIG. 2 is a system diagram illustrating an embodiment of a computing system including an event messaging system and a backlit keyboard.

Referring now to FIG. 2, an embodiment of a keyboard backlight event messaging system 200 is illustrated. The keyboard backlight event messaging system 200 may be provided in a computing system 202 that is illustrated as a desktop computer, although other computing systems including laptop/notebook computers, servers, and/or other computing systems that may utilize a backlit keyboard will benefit from the teachings of the present disclosure and thus fall within its scope. In an embodiment, the computing system 202 may be the IHS discussed above with reference to FIG. 1 and/or may include some or all of the components of the IHS 100. As discussed below, the computing system 202 may be configured to provide an instruction to activate a subset of a plurality of light emitting subsystems of a backlit keyboard to provide an event message, as well as provide a variety of other computing system functionality known in the art. The keyboard backlight event messaging system 200 also includes a backlit keyboard 204 that may include a single color light emitting diode (LED) backlit keyboard, a Red, Green, and Blue (RGB) LED backlit keyboard, combinations thereof, and/or other keyboard backlighting subsystems known in the art. The backlit keyboard 204 may be coupled to and in communication with the computing system 202. For example, in the illustrated embodiment, the backlit keyboard 204 may be coupled to the computing system 202 via a wired or wireless connection. In another example, the computing system 202 may include the backlit keyboard 204 that is integrated into the computing system 202 (e.g., in a laptop/notebook computing system). The backlit keyboard 204 includes a plurality of keys (e.g., key 206) where each key represents at least one alphabetic character, numeric character, and/or other symbolic characters or commands known in the art. Each respective key 206 may include a light emitting subsystem (e.g., an LED subsystem) configured to backlight that respective key when activated. While a specific embodiment of a keyboard backlight light event messaging system 200 has been illustrated and described, one of skill in the art in possession of the present disclosure will recognize that a wide variety of modification to the keyboard light event messaging system 200 will fall within the scope of the present disclosure, including combining components, modifying components, adding components, removing components, distributing components across multiple chassis, and the like.

Figure 3:
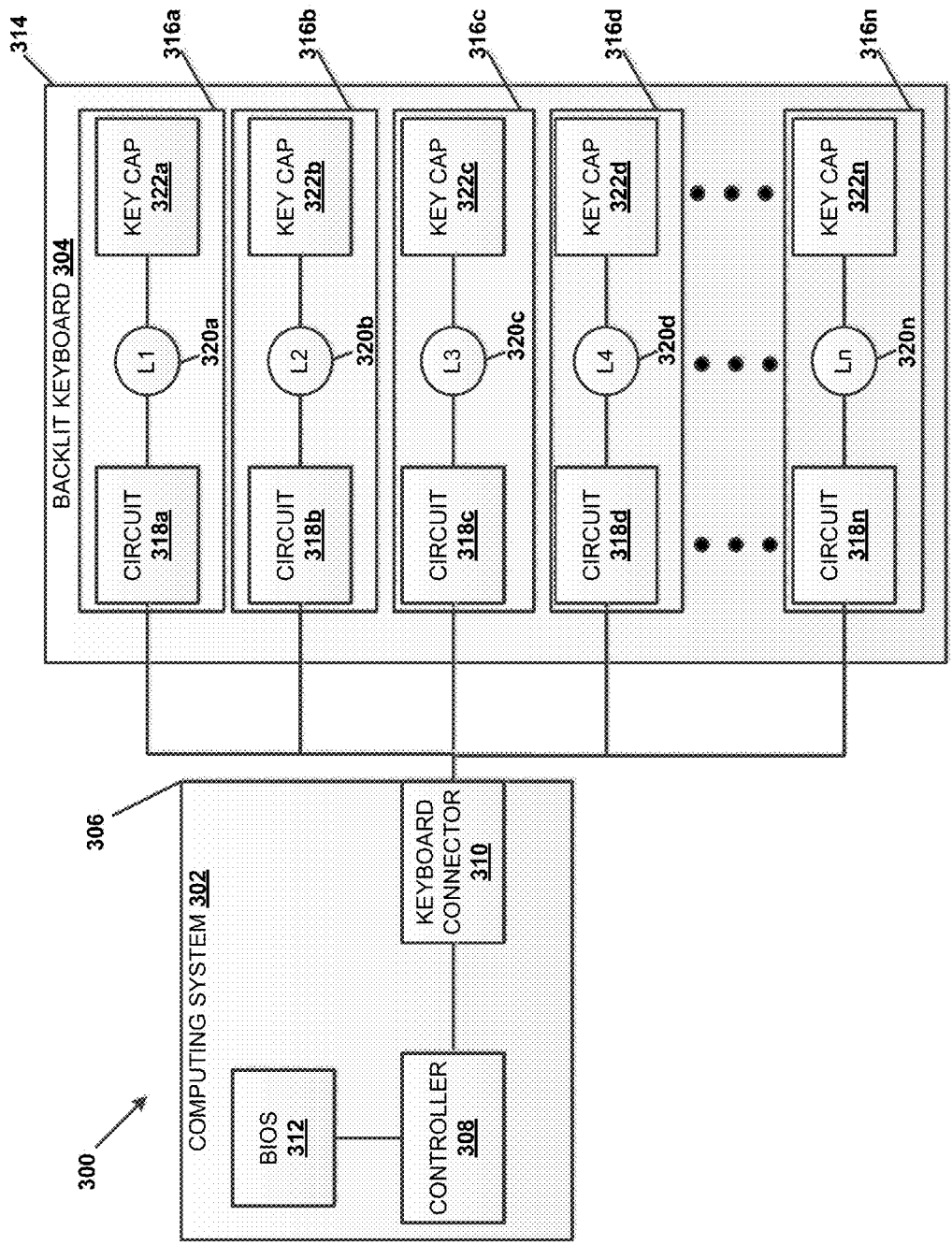
FIG. 3 is a schematic view illustrating an embodiment of the event messaging system and the backlit keyboard of the computing system in FIG. 2.

Referring now to FIG. 3, an embodiment of a keyboard backlight event messaging system 300 is illustrated that may be the keyboard backlight event messaging system 200 discussed above with reference to FIG. 2. As such, the keyboard backlight event messaging system 300 may be the IHS 100 discussed above with reference to FIG. 1 and/or may include some or all of the components of the IHS 100, and in specific embodiments may include a computing system (e.g., a desktop computing system, a laptop/notebook computing system, etc.) that is coupled to or integrates a backlit keyboard. In the illustrated embodiment, the keyboard backlight event messaging system 300 includes a computing system 302 that may be the computing system 202 discussed above with reference to FIG. 2. As such, the computing system 300 may be the IHS 100 discussed above with reference to FIG. 1. The computing system 302 includes a chassis 306 that houses components of the computing system 302, only some of which are illustrated in FIG. 3. For example, the chassis 301 may include a processing system (not illustrated but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a controller 308 that is configured to perform the functions of the controllers and computing systems discussed below. In various embodiments, the controller 308 may include logic and memory independent of the processor 102 (e.g., a Central Processing Unit (CPU) and system memory 114 discussed above with reference to FIG. 1. For example, the controller 308 may be provided by an embedded controller that includes a microcontroller that performs various tasks that an operating system of the computing system 302 does not perform such as, for example, receiving and processing signals from a keyboard, providing signals to the keyboard, controlling light emitting subsystems, providing thermal measurement and response including fan control and CPU throttling, managing a battery charger and a battery, and other embedded controller tasks known in the art.

In the illustrated embodiment, the chassis 306 also houses a keyboard connector 310 that is coupled to the controller 308 and that may include a Personal System/2 (PS/2) port, a universal serial bus USB port, a serial port, a wireless communication device that utilizes radio frequency, infrared, and/or Bluetooth technology, combinations thereof, and/or any other keyboard connector known in the art that provides for a communication connection between the computing system 302 and a keyboard. The keyboard connector 310 may be coupled to a backlit keyboard 304 discussed below. While the backlit keyboard 304 is illustrated in some embodiments as an external backlit keyboard that is coupled to the computing system 302, as discussed above the backlit keyboard 304 may be integrated with the computing system 302 and, as such, the keyboard connector 310 may be an internal keyboard connector while remaining within the scope of the present disclosure.

The chassis 306 may also houses a basic input/output system (BIOS) 312 that may provide firmware that is configured to perform hardware initialization during a boot process for the computing system 302, provide runtime services for operating systems and programs provided in the computing system 302, and/or perform a variety of other BIOS functionality known in the art. In some embodiments, the BIOS 312 may be provided by a Unified Extensible Firmware Interface (UEFI) system while remaining within the scope of the present disclosure. Thus, while UEFI is known in the art as a specification that has been provided to replace BIOS and that defines a software interface between an operating system and platform firmware provided on computing systems, the discussions of the BIOS functionality below are intended to encompass UEFI system functionality as well (i.e., a UEFI system may provide the BIOS 312 that performs the functionality discussed below while remaining within the scope of the present disclosure.) In the illustrated embodiment, the BIOS 312 may be coupled to the controller 308 and configured to communicate to the controller 308 an event such as, for example, an error during the boot process of the computing system 302.

The keyboard backlight event messaging system 300 also includes a backlit keyboard 304 that may be the backlit keyboard 204 discussed above with reference to FIG. 2. In the illustrated embodiment, the backlit keyboard 304 includes a chassis 314 that houses components of the backlit keyboard 304, only some of which are illustrated in FIG. 3. As discussed above, the backlit keyboard 304 may be a standalone device in the keyboard backlight event messaging system 300 that may be coupled to an external keyboard connector 310 in the computing system 302. However, in various embodiments the chassis 306 of the computing system 302 may house the backlit keyboard 304 as an integrated keyboard that is coupled to the controller 308 via an internal keyboard connector 310. The chassis 314 houses a plurality of keys such as, for example, the keys 316*a*-316*n*. Each of the plurality of keys 316*a*-316*n* may include a respective circuit 318*a*-318*n*, a respective light emitting subsystem 320*a*-320*n*, and a respective key cap 322*a*-322*n*. The circuits 318*a*-318*n* are coupled through the keyboard connector 310 of the computing system 302 with the controller 308 to allow the circuits 318*a*-318*n* to send and/or receive instructions with the controller 308. As discussed below, the circuits 318*a*-318*n* may be configured to activate or deactivate their respective light emitting subsystem 320*a*-320*n*.

The light emitting subsystems 320*a*-320*n* may include at least one light emitting diode (LED) that emits light when a voltage is applied to the LED. For example, the light emitting subsystems 320*a*-320*n* may include RGB LEDs that include a red LED, a green LED, and a blue LED. However, each light emitting subsystems 320*a*-320*n* may be provided by other light emitting subsystems such as, for example, a single color LED, a Cyan, Magenta, Yellow, Key (black) (CNYK) LED subsystem, an organic LED (OLED) subsystem, a subsystem utilizing incident light and/or other light emitting subsystems known in the art. Each light emitting subsystem 320*a*-320*n* may be configured to emit light energy to illuminate their respective key cap 322*a*-322*n* that may be coupled to the respective light emitting subsystem and/or otherwise in light communication with the respective light emitting subsystem via any of a variety of light couplings known in the art (e.g., adjacent placement of the key cap and light emitting subsystem, fiber optic couplings, etc.). Each key cap 322*a*-322*n* may also include and/or represent at least one symbol such as an alphabetic character, a numeric character, a punctuation character, a command symbol, and other symbols or combinations of symbols known in the art, as illustrated in FIG. 2. While a specific computing system 302 and backlit keyboard 304 are illustrated and described in FIG. 3, a wide variety of modification to the computing system 302 and/or backlit keyboard 304 is envisioned as falling within the scope of the present disclosure, as virtually any computing system 304 utilizing a backlit keyboard is envisioned as benefiting from the teachings provided herein.

Figure 4:
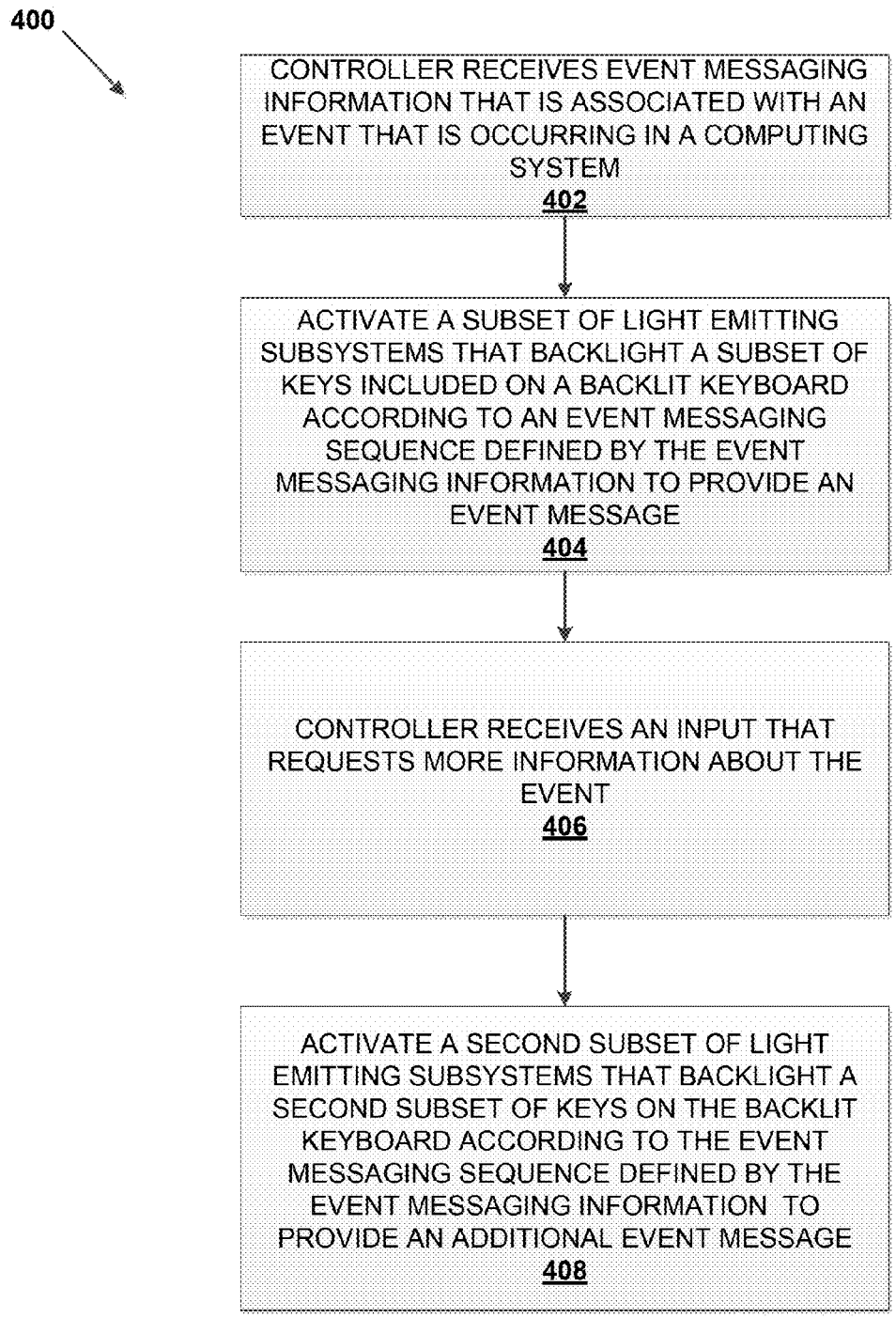
FIG. 4 is a flow chart illustrating an embodiment of a method for providing event messaging.

Referring now to FIG. 4, an embodiment of a method 400 for providing keyboard backlight event messaging is illustrated. As discussed below, the systems and methods of the present disclosure provide event messaging by sequentially backlighting keys of a backlit keyboard to communicate information about an event occurring in a computing system. Such event messaging may be performed, in part, by a controller receiving event messaging information that is associated with the event occurring in the computing system. The controller may then activate a subset of the plurality of light emitting subsystems according to an event messaging sequence defined by the event messaging information to provide an event message. For example, each key of the respective subset of the plurality of keys may represent an alphabetic character and the activation of the subset of the plurality of light emitting subsystems may backlight each key in a sequence that spells out the event message. As discussed below, such systems and methods enable the ability of a computing system to communicate any of a variety of events occurring in the computing system through the use of a backlit keyboard. For example, the systems and methods of the present disclosure enable the computing system to efficiently communicate events occurring before a display device is initialized during a boot process and/or provide BIOS based messaging when an operating system is running but a BIOS based messaging operating system stack/layer is not present. Ineffective communication of events in a computing system may result in time consuming diagnostics by a user and result in system issues that could have been prevented if addressed when the event was communicated, and the system and methods of the present disclosure provide for faster diagnostic time by allowing a user to simply read event messages being spelled out on a backlit keyboard, and resolve those system events before other system issues occur.

The method 400 begins at block 402 where the controller receives event messaging information that is associated with an event in a computing system. In an embodiment, at block 402 an event may occur in the computing system 202/302. For example, events that may occur at block 402 includes system errors, system warnings, system status alerts, component errors, component warnings, component status alerts, power status and/or a variety of other computing system events known in the art. In an embodiment, at block 402, the controller 308 may receive the event messaging information that is associated with the event. For example, a component of the computing system 302 may determine that an event is occurring and, in response, generate event messaging information. The component may then provide to the controller 308 the event messaging information. For example, graphics cards, network cards, memory systems, disk drives, flash memory, batteries, power subsystems, and/or other components may determine their own events, generate event messaging information known in the art, and provide the event messaging information to the controller 308, which may in turn receive the event messaging information.

In an embodiment, the controller 308 may detect events and determine the event messaging information for the event. For example, the controller 308 may be an embedded controller that is configured to manage one or more components of the computing device as described above. As such, the controller 308 may detect events that occur on the one or more components that is managed by the controller 308, and may determine event messaging information based on the events that the controller 308 detects. In a specific example, the controller 308 may provide thermal management to the computing system 302 by controlling a fan to cool components of the computing system 302. To control the fan, the controller 308 may receive signals from sensors to determine the temperature of components of the computing system 302 and/or the temperature of the computing system 302. Based on the temperature and other factors known in the art, the controller 308 may activate one or more fans at various speeds and/or other cooling devices known in the art. The controller 308 may be configured to determine event messaging information based on the temperature of the computing system 302. For example, the controller 308 may determine event messaging information if the computing system 302 is at a critical state of overheating, if the temperature of the computing system 302 is in an ideal state, or if the temperature of the computing system 302 is at a cautionary state. In other examples, the controller 308 may detect an operational status of the fan such as, for example, whether the fan is functioning properly or not and determine event messaging information based on the operational status of the fan.

In another specific example, the controller 308 may manage a battery and a battery charger of the computing system 302. As such, the controller 308 may detect a power level of the battery at any given time and determine event messaging information based on the power level of the battery. For example, the controller 308 may detect that the power level is low, medium, or high. In other examples, the controller 308 may detect errors with the battery charger such as too much current being provided to the battery at a specific time. At block 402, the controller 308 may determine event messaging information based on the detected power level and/or battery charger errors.

In another embodiment, at block 402, the BIOS 312 may provide the controller 308 event messaging information that is associated with the event. For example, the BIOS 312 may detect and provide the controller 308 event messaging information for events such as, for example, non-volatile random access memory (NVRAM) read/write failures, direct memory access (DMA) initialization failure, video memory failures, time-of-day clock failures, real-time clock (RTC) power failures, liquid crystal display (LCD) failures, central processing unit (CPU) cache test failures, authentication failures, virus detection failures, and other BIOS-detectable events known in the art. As discussed below, the events detected by the BIOS 312 and the associated event messaging information provided to the controller 308 may occur before the initialization of a display device, may result from an event where the display device has failed, may occur where an operating system is missing drivers/components needed to communicate BIOS messages with the display device, and/or may otherwise occur in a scenario where the display device cannot be used to communicate the event to the user of the computing device 308. However, as discussed below, the controller 308 and backlit keyboard 304 may enable the communication of that event message by activation of a first subset of light emitting subsystems on the backlit keyboard as described below to communicate the event to the user of the computing system. While specific examples have been provided of the controller 308 receiving event messaging information based on detected events occurring in the computing system 302, detecting events that occur in the computing system 302, determining event messaging information from the detected events, and receiving event messaging information from the BIOS 312 or other components of the computing system 302 may be performed in a variety of other manners that will fall within the scope of the present disclosure.

In an embodiment, in response to the controller 308 determining the event messaging information and/or receiving the event messaging information, the controller 308 may retrieve an event messaging sequence based on the event messaging information. The event messaging sequence may be may provide for the lighting of the keys 316a-316n in any sequence that allows an event message to be communicated to a user of the computing system 302. For example, the controller 308 may determine that an event messaging sequence for an event messaging information received in response to an NVRAM read/write failure event is "NVRAM" (e.g., a backlighting sequence that first backlights an "N" key, then backlights a "V" key, then backlights an "R" key, then backlights an "A" key, and then backlights an "M") In another example, if the event includes that the battery power level is low, the controller 308 may determine that the event messaging sequence may be activating a red color in the light emitting subsystems 320a-320n of the backlit keyboard 304. In one embodiment, the controller 308 may use the received event messaging information to retrieve an event messaging sequence from a database that associates event messaging sequences with event message information. In another embodiment, the controller 308 may convert or translate the event messaging information into an event messaging sequence. For example, the controller 308 may be configured to translate an error text string received from the BIOS 312 as event message information into an event message sequence.

The method 400 then proceeds to block 404 where a first subset of light emitting subsystems that backlight a first subset of keys included on a backlit keyboard are activated according to an event messaging sequence defined by the event messaging information to provide an event message. In an embodiment, the controller 308 may activate a first subset of the light emitting subsystems 320a-320n of the backlit keyboard 304 according to the event message sequence determined at block 402. In some embodiments, the controller 308 may provide instructions to execute the event message sequence through the keyboard connector 310 to the backlit keyboard 304, which may be configured to activate the first subset of the light emitting subsystems 320a-320n of the backlit keyboard 304 according to those instructions. For example, the controller 308 may activate the first subset of light emitting subsystems 320a-320n by providing signals according to the event message sequence via the keyboard connector 310 to each key in the backlit keyboard 304 that is to be activated according to the event message sequent. The signal may be received by the chip (e.g., chips 318a-318n) in each key, and the chip may then activate its associated light emitting subsystem (e.g., light emitting subsystems 320a-320n) to backlight its associated key cap (e.g., key caps 322a-322n). In a specific example, a portion of the event message sequence may require the backlight key 316a to be activated and, in response, the controller 308 may send a signal to the chip 318a that causes the chip 318a to activate light emitting subsystem 320a. Activation of light emitting subsystem 320a will then cause the key cap 322a to be backlit. In some embodiments, more than one key may be backlit at the same time.

One of skill in the art in possession of the present disclosure will recognize that the key backlighting discussed above may be performed on each key in the first subset of keys included on the backlit keyboard to activate that first subset of keys in a sequence defined by the event messaging sequence. For example, a first key of the first subset of keys may be backlit for a first time period and deactivated when that first time period ends, a second key of the first subset of keys may then be backlit for a second time period that follows the first time period, and then deactivated when that second time period ends, and so forth. Each key may be backlit for a predefined time duration that may be set as a default (that may be adjusted by a user), defined by the event message sequence followed by a predefined time duration when no keys are backlit or all keys are deactivated before another key is activated/backlit, and/or determined in a variety of manners known in the art.

Referring to FIG. 3 and according to an example event message sequence, the backlighting of key 316a may be activated first, the backlighting of key 316d may be activated second, the backlighting of key 316b may be activated third, and the backlighting of key 316b may be activated fourth. To communicate key 316b being activated third and fourth, a duration of inactive light emitting subsystems may be necessary between the sequential activation of key 316b. In an embodiment, the key caps 322a-322n may include a symbol such as, for example, an alphabetic character that when activated in the sequence defined by the event messaging sequence may spell out a word, a phrase, an abbreviation, and acronym and other combinations of alphabetic characters known in the art to convey an event message sequence. Therefore, to indicate a word that has consecutive letters being the same alphabetic character, a duration of inactive backlighting of the key that includes the same alphabetic character that is to be repeated may be necessary to communicate the alphabetic character consecutively. In an embodiment, the first subset of keys defined by the event message sequence may be activated one or more times (i.e., repeated) after an initial event message sequence is communicated in order to allow a user that may have missed the beginning of the event messaging sequent to see the event messaging sequent, thus increasing the odds that the event message sequence will be communicated to the user. In other embodiments, a signal may be provided to a user that an event message needs to be communicated (e.g., activating and deactivating a key (or all the keys) in a blinking pattern), and a user may then provide an instruction (e.g., a selection of any of the keys) to have the event message sequence activated on the backlit keyboard 314.

Figure 5:
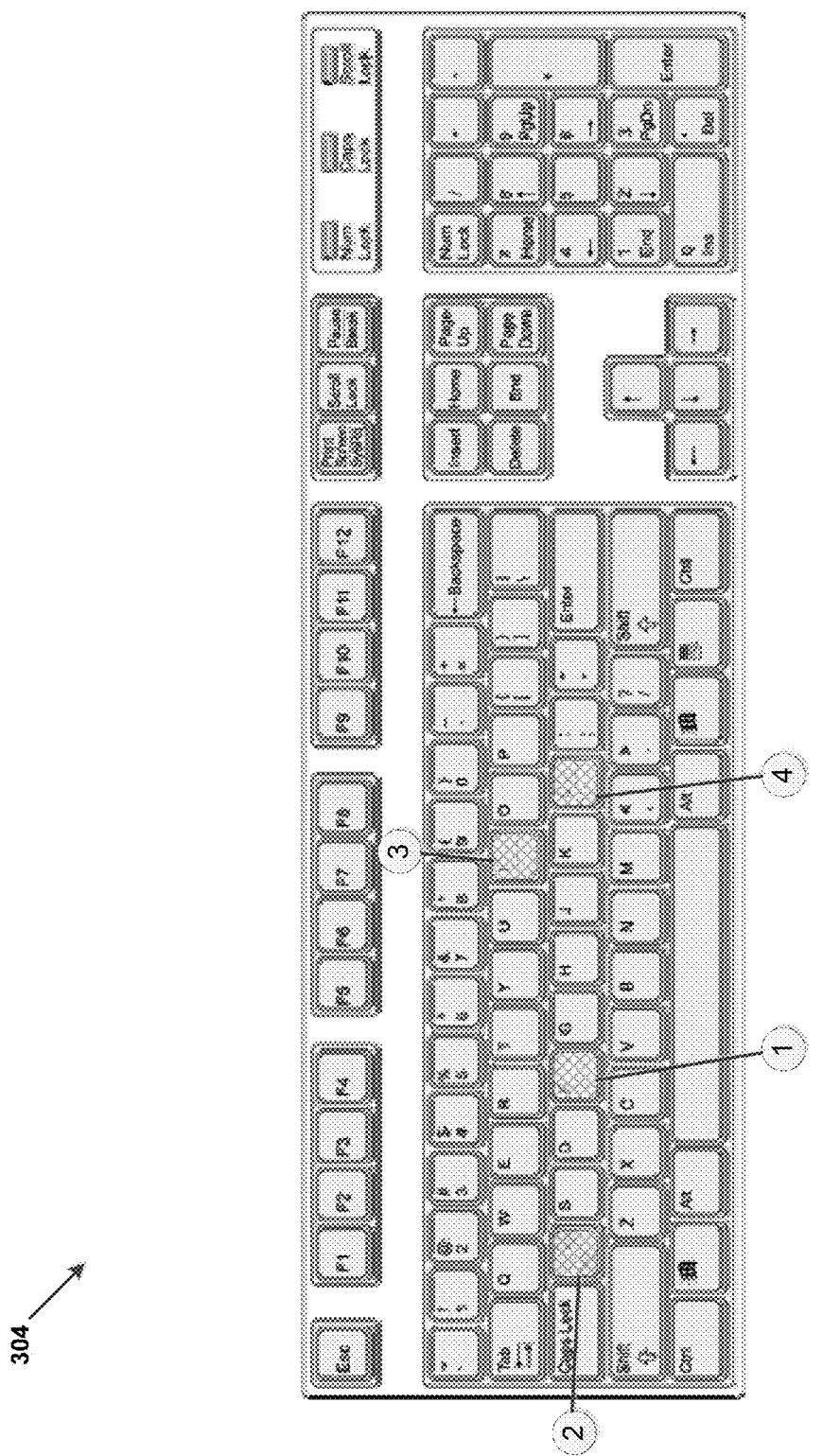
FIG. 5 is a top view illustrating an embodiment of an event message provided through the backlit keyboard of the computing system of FIG. 3.

Referring to FIG. 5, an example is illustrated of a top view of an embodiment of an event message provided through the backlit keyboard 304 of the computing system 302 of FIG. 3. In an embodiment, the controller 308 may have received event messaging information about a failed memory device. In response, the controller 308 may have retrieved or determined the event messaging sequence from the event messaging information to be "Failed Mem." at block 404 the controller 308 may then activate each key of the backlit keyboard 304 to spell out "Failed Mem." As illustrated in FIG. 5, during a first time period at step 1 a light emitting subsystem is activated for the key that represents "F." During a second period at step 2 that follows the first time period, a light emitting subsystem is activated for the key that represents "A." During a third time period at step 3 that follows the second time period, a light emitting subsystem is activated for the key that represents "I." During a fourth time period at step 4 that follows the third time period, a light emitting subsystem is activated for the key that represents "L", and so on until all light emitting subsystems have been activated for the event messaging sequence "Failed Mem." As discussed above, the light emitting subsystems for any key (e.g., the "F" key backlit at step 1) may have deactivated before the light emitting subsystem for the subsequent key (e.g., the "A" key) is activated, or may remain activated when the subsequent key is activated.

In some embodiments, the first subset of keys included on the backlit keyboard may be activated with a particular color scheme and/or brightness intensity defined by the event message sequence. For example, the controller 308 may be configured to determine a severity level of the event message information and communicate the severity level of an event by activating a subset of keys in a particular color or colors that are different from the colors used to report an event with a lower or higher severity. In a specific example, the controller 308 may activate a subset of keys with a first color (e.g., green color) and/or a first intensity (e.g., low brightness intensity) if the event message information relates to a low or no severity level such as a "component status good" message. Continuing with that example, the controller 308 may activate a subset of keys with a second color (e.g., yellow color) and/or a second intensity (e.g., a moderate intensity greater than the first intensity) if the event message information relates to an event having an intermediate severity level such as, for example, an error that occurs that may result in a decrease of system performance like a failed dual inline memory module (DIMM). Continuing with that example, the controller 308 may activate a subset of keys with a third color (e.g., a red color) and/or a third intensity (e.g., very bright intensity greater than the second intensity) if the event message information relates to an event having a high severity level such as, for example, a failure of a component critical to the operation of the computing system 302 like a failed device display to a disk that prevents booting of the computing system 302.

The color scheme and/or brightness intensity may be used in addition to or separate from a sequence of alphabetic characters that spell out an event message. For example, the color scheme and/or brightness intensity discussed above may be provided to backlight the keys when each key is activated to spell out the event message sequence such as in the example in FIG. 5 (e.g., each key in the sequence of "Failed Mem." may be backlit with a yellow color to denote the memory failure is non-critical.) In other embodiments, other keys may be backlit with a corresponding severity level color scheme and/or intensity that are not used to spell out the event message sequence. For example, all of the keys may be backlit with a first color and/or first intensity that represents the severity level of the event and the sequence of keys that spells out the event may be backlit with a second color. In another example, groups of keys may be associated with a certain component of the computing system 302. For example, a first section of the backlit keyboard 304 (e.g., the "F1", "F2", "F3", and "F4" keys) may be associated with a first component and/or state of the computing system 302, while a second section of the backlit keyboard 304 (e.g., the keys that provide the number pad) may be associated with a second component in the computing system 302, and a third section of the backlit keyboard 304 (e.g., the number keys "1" through "0") may be associated with third component in the computing system 302, or used to communicate severity level of any event message information received by the controller 308.

Figure 6:
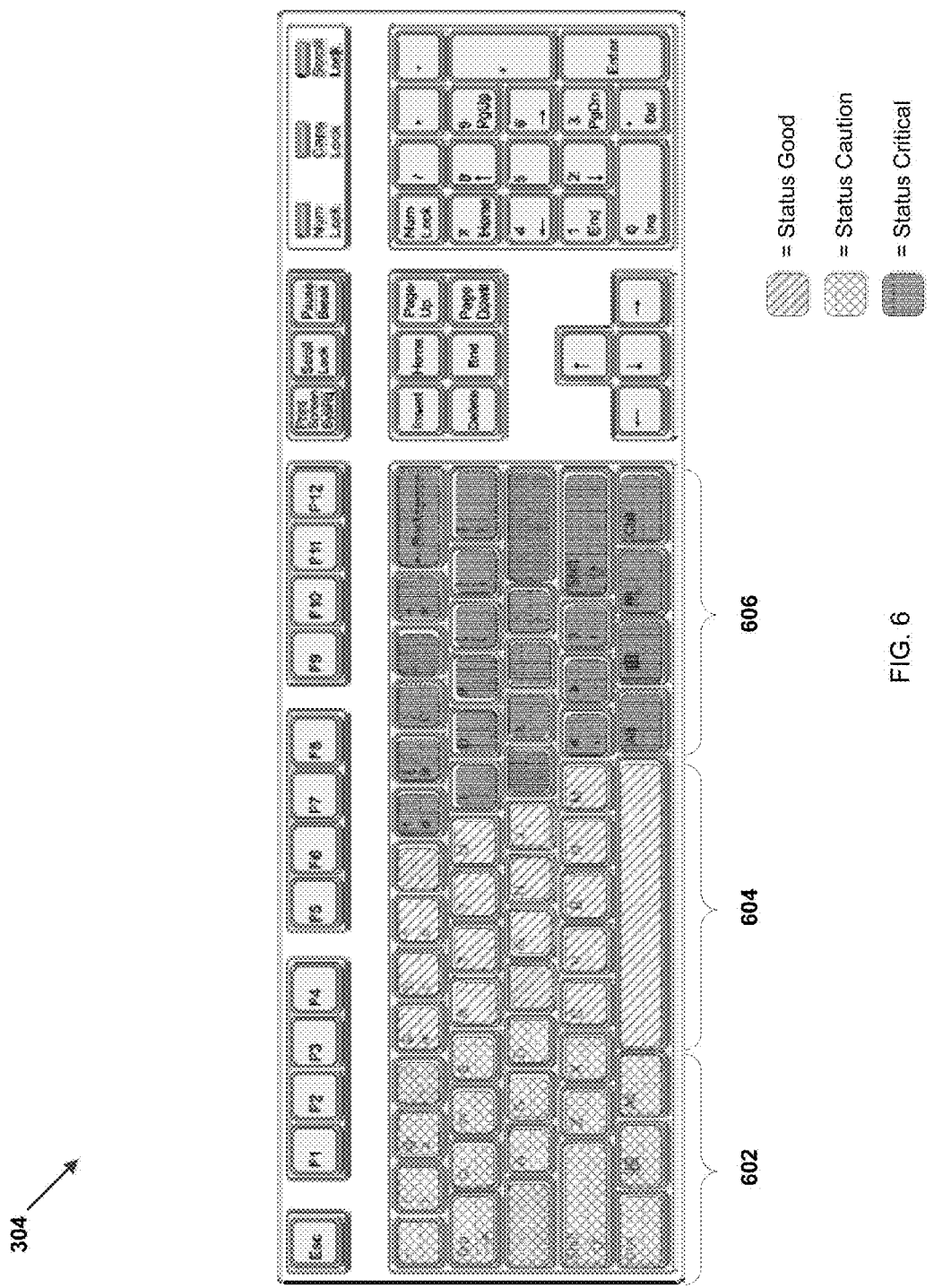
FIG. 6 is a top view illustrating an embodiment of an event message provided through the backlit keyboard of the computing system of FIG. 3.

Referring to FIG. 6, an example is illustrated of a top view of an embodiment of an event message provided through the backlit keyboard 304 of the computing system 302 of FIG. 3. The example in FIG. 6 illustrates activating light emitting subsystems for the first subset of keys included on the backlit keyboard 304 with a particular color scheme and/or brightness intensity defined by the event message sequence. In the illustrated embodiment, the backlit keyboard 304 may include separate sections. For example, a first section 602 may be a first subset of keys associated with the temperature of the computing system 302, a second section 604 may be a second subset of keys associated with battery life of the computing system 302, and a third section 606 may be a third subset of keys associated with a severity level of an event message sequence that is to be spelt out on the backlit keyboard according to methods described above. If the controller 308 receives event message information at block 402 that the temperature of the computing system 304 has reached a cautionary level, then the controller 308 may activate the backlighting of the first subset of keys of the first section 602 that are associated with the temperature level of the computing system 302 to have a cautionary color such as, for example, yellow or an intermediate light intensity backlighting the first subset of keys of the backlit keyboard 304. If the controller 308 receives event message information that the battery level of the device is high, then the controller 308 may activate the backlighting of the second subset of keys of the second section 604 with a status good color such as, for example, green. If the controller 308 receives event message information that there is a failure of a critical component of the computing system 302, then the controller 308 may activate the backlighting of the third subset of keys of the third section 606 with a status critical color such as, for example, red. While specific examples of the controller 308 activating a first subset of keys based on event message sequence of detected events occurring in the computing system 302, and activating a backlit keyboard 304 to communicate an event message sequence and/or a severity level are disclosed, one of skill in the art in possession of the present disclosure will recognize that the controller 308 may activate a backlit keyboard 304 to communicate an event message sequence in a variety of other manners that will fall within the scope of the present disclosure.

The method 400 then proceeds to block 406 where the controller receives an input that requests more information about the event. In an embodiment, the controller 308 may be configured to receive an input with instructions requesting additional event information. For example, the controller 308 may be configured to receive a signal from one or more keys of the backlit keyboard 304 that requests the controller 308 provide additional event information. In another example, the controller 308 may receive such an input by a voice command, a mouse click, touch screen, and any other input known in the art that may be used request information. In response, the controller 308 may then activate a different subset of keys on the backlit keyboard 304 (relative to those that were activated in block 404) that are associated with the event message sequence. As such, the event message sequence may include a plurality of event messages such that a first event message of the event message sequence activates the first subset keys, a second event message from the event message sequence activates a second subset of keys, and so on. In some examples, the input received at block 406 by the controller 308 may provide a request for the second event message from the event message sequence. In other examples, the input received at block 406 by the controller 308 may request that the first subset of keys be activated again. In yet other examples, the input received at block 406 by the controller 308 may request that the severity level or any other information about the event be provided to the backlit keyboard 304. In yet other examples, the input received at block 406 by the controller 308 may also request an event message sequence of a second event that occurred in the computing system 302.

The method 400 then proceeds to block 408 where a second subset of light emitting subsystems that backlight a second subset of keys included on the backlit keyboard are activated according to the event messaging sequence defined by the event messaging information to provide an additional event message. In an embodiment, the controller 308 may activate the second subset of light emitting subsystems 320*a*-320*n* of the backlit keyboard 304. In some embodiments, the controller 308 may provide instructions according to the event message sequence to backlight the keys in the backlit keyboard 304, which may be configured to activate the second subset of the light emitting subsystems 320*a*-320*n* of the backlit keyboard 304 according to the event messaging sequence. For example, the controller 308 may activate the second subset of light emitting subsystems 320*a*-320*n* by providing signals defined by the event message sequence via the keyboard connector 310 to the backlit keyboard 304 substantially as described above, and the signals may be received by one or more keys of the keys 316*a*-316*n*. The signal may be received by a chip (e.g., chips 318*a*-318*n*) in each key, and the chip may activate its associated light emitting subsystem to backlight its associated key cap (e.g., key caps 322*a*-322*n*). In a specific example, the event message sequence may require the backlighting of key 316*b*, and a signal may be sent to chip 318*a* to activate light emitting subsystem 320*b* to cause the key cap 322*b* to be backlit.

As discussed above, the activation of the second subset of light emitting subsystems that backlight the second subset of keys included on the backlit keyboard 304 may communicate a second portion of the event message sequences that was not communicated with the first portion of the event message, a severity level, more specific event message information, and/or other event message information known in the art. Continuing with the example discussed above with reference to FIG. 5, the first subset of light emitting subsystems were activated to backlight the first subset of keys of the backlit keyboard 304 to communicate the event message "Failed Mem." for event message information that indicated that memory had failed. At block 408, the controller 308 may receive an input for more information, and the controller 308 may determine that a second portion of the event message sequence states which memory device(s) failed. For example, the controller 308 may determine that a particular dual in-line memory module (DIMM) failed (e.g., DIMM #2 in the memory subsystem) from the event messaging information and, in response, may execute the event memory sequent to activate the second subset of light emitting subsystems to backlight the second subset of keys to spell out "DIMM2" as the second portion of the event message in substantially the same manner as discussed above. The controller 308 may receive subsequent inputs for more information about the event and may provide finer detail by activating a third subset of light emitting subsystems, a fourth subset of light emitting subsystems, and so on until all information has been provided by the controller or the controller 308 stops receiving inputs that request more information about the event.

While a specific example of a failed memory device has been utilized above in the provisioning of an event message, one of skill in the art in possession of the present disclosure will recognize that any of a variety of error situations may occur that may be communicated by the keyboard backlight event messaging system of the present disclosure. For example, in response to the computing system booting and a user being prompted to provide a biometric authentication (e.g., a thumbprint), and that biometric authentication failing, the keyboard backlight event messaging system may backlight the keys on the backlight keyboard to spell out "FAILED AUTH". In another example, in response to a faulty power rail in the computing system, the keyboard backlight event messaging system may backlight the keys on the backlight keyboard to spell out "POWER FAILURE". Furthermore, while specific examples of the use of the keyboard backlight event messaging system when a display device is unavailable (e.g., in response to a failed boot), the keyboard backlight event messaging system may be utilized during OS runtime and when a display device is active as well, but a BIOS messaging driver is not present in OS. Further still, while the keyboard backlight event messaging system has been described as being used to spell out words (or portions of words) that describe an event, keys may be backlit according to the teachings of the present disclosure to indicate to a user a key to select to, for example, correct an issue associated with an event.

Thus, systems and methods have been described that provide for event messaging by utilizing key-specific RGB keyboard backlighting system that provide key-addressable backlighting to backlight keys of a backlit keyboard in order to communicate information about an event occurring in a computing system. Such event messaging is performed, in part, by a controller activating a subset of the plurality of light emitting subsystems according to an event messaging sequence defined by the event messaging information to spell out an event message and, in some cases, indicate a severity of that event message. Such systems and methods enable the ability of a computing system to communicate events occurring in the computing system through the use of a backlit keyboard as an alternative communication path instead of a display device, a simple light indicator, or a sound device, which allows the computing system to communicate events occurring before a display device is initialized during a boot process without requiring a user to record the communication and decipher its meaning via separate documentation (i.e., the user simply needs to spell out the work communicated in the event message). Communication of events through a backlit keyboard according to the teachings of the present disclosure results in faster diagnostic time and resolved system events.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An event messaging system, comprising:
  a backlit keyboard including:
    a plurality of keys; and
    a plurality of light emitting subsystems, wherein each respective light emitting subsystem of the plurality of light emitting subsystems is configured to backlight a respective key of the plurality of keys; and
  a computing system that is coupled to the backlit keyboard, wherein the computing system includes a controller that is coupled to the backlit keyboard and that is configured, in response to an event occurring in the computing system, to:
    receive event messaging information that is associated with the event; and
    activate a subset of the plurality of light emitting subsystems according to an event messaging sequence defined by the event messaging information in order to backlight a respective subset of the plurality of keys to provide an event message.

2. The system of claim 1, further comprising:
  a basic input/output system (BIOS) coupled to the controller, wherein the controller is configured to receive the event messaging information as an error text string from the BIOS, and translate the error text string to the event messaging sequence.

3. The system of claim 1, wherein the activating the subset of the plurality of light emitting subsystems according to the event messaging sequence defined by the event messaging information in order to backlight the respective subset of the plurality of keys includes backlighting the respective subset of the plurality of keys that include keys that include an alphabet in order to spell out an indication of the event.

4. The system of claim 1, wherein the embedded controller is configured to:
  determine a severity level of the event; and
  activate the subset of the plurality of light emitting subsystems to indicate the severity level of the event.

5. The system of claim 4, wherein the embedded controller is configured to:
  activate the subset of the plurality of light emitting subsystems to emit a first color of light in response to determining a first severity level for the event; and
  activate the subset of the plurality of light emitting subsystems to emit a second color of light in response to determining a second severity level for the event that is different than the first severity level.

6. The system of claim 1, wherein the embedded controller is configured to:
  activate a first subset of the plurality of light emitting subsystems according to the event messaging sequence defined by the event messaging information in order to backlight a first respective subset of the plurality of keys to provide a first portion of the event message;
  receive an input that requests more information about the event and, in response, activate a second subset of the plurality of light emitting subsystems according to the event messaging sequence defined by the event messaging information in order to backlight a second respective subset of the plurality of keys to provide a second portion of the event message.

7. The system of claim 1, wherein each of the plurality of emitting subsystems is a red light emitting device that is configured to emit red light, a green light emitting device that is configured to emit green light, and a blue light emitting device that is configured to emit blue light.

8. An information handling system (IHS), comprising:
  a chassis;
  a keyboard connector that is located on the chassis and that is configured to couple to a backlit keyboard that includes:
    a plurality of keys; and
    a plurality of light emitting subsystems, where each respective light emitting subsystem of the plurality of light emitting subsystems is configured to backlight a respective key of the plurality of keys; and
  a controller that is coupled to the keyboard connector and that is configured to:
    receive event messaging information that is associated with an event; and
    provide an instruction through the keyboard connector that is configured to activate a subset of a plurality of light emitting subsystems according to an event messaging sequence defined by the event messaging information in order to backlight a respective subset of the plurality of keys to provide an event message.

9. The IHS of claim 8, further comprising a basic input/output system (BIOS) coupled to the controller, wherein the controller is configured to receive the event messaging information as an error text string from the BIOS, and translate the error text string to the event messaging sequence.

10. The IHS of claim 8, wherein the providing the instruction through the keyboard connector that is configured to activate the subset of the plurality of light emitting subsystems according to the event messaging sequence defined by the event messaging information in order to backlight the respective subset of the plurality of keys includes backlighting the respective subset of the plurality of keys that include keys that include an alphabet in order to spell out an indication of the event.

11. The IHS of claim 8, wherein the controller is configured to:
determine a severity level of the event; and
activate the subset of the plurality of light emitting subsystems to indicate the severity level of the event.

12. The IHS of claim 11, wherein the controller is configured to:
activate the subset of the plurality of light emitting subsystems to emit a first color of light in response to determining a first severity level for the event; and
activate the subset of the plurality of light emitting subsystems to emit a second color of light in response to determining a second severity level for the event that is different than the first severity level.

13. The IHS of claim 8, wherein the instructions to activate the subset of the plurality of light indicators of the backlit keyboard based on the system condition includes:
instructions to activate a first subset of the plurality of light indicators to communicate to a user a first subset of the system condition; and
instructions to activate a second subset of the plurality of light indicators to communicate to the user a second subset of the system condition.

14. The system of claim 8, wherein the embedded controller is configured to:
activate a first subset of the plurality of light emitting subsystems according to the event messaging sequence defined by the event messaging information in order to backlight a first respective subset of the plurality of keys to provide a first portion of the event message;
receive an input that requests more information about the event and, in response, activate a second subset of the plurality of light emitting subsystems according to the event messaging sequence defined by the event messaging information in order to backlight a second respective subset of the plurality of keys to provide a second portion of the event message.

15. A method for providing event messaging, comprising:
receive, by a controller that is included in a computing system and coupled to a backlit keyboard, event messaging information that is associated with an event that is occurring in the computing system; and
activating, by the controller, a subset of a plurality of light emitting subsystems included on the backlit keyboard according to an event messaging sequence defined by the event messaging information;
wherein the activation of the subset of the plurality of light emitting subsystems according to the event messaging sequence results in the backlighting of a plurality of keys included on the backlit keyboard to provide an event message.

16. The method of claim 15 further comprising:
receiving, by the controller from a basic input/output system (BIOS) coupled to the controller, the event messaging information as an error text string from the BIOS; and
translating, by the controller, the error text string to the event messaging sequence.

17. The method of claim 15, wherein the activating, by the controller, the subset of the plurality of light emitting subsystems included on the backlit keyboard according to the event messaging sequence defined by the event messaging information to backlight the plurality of keys included on the backlit keyboard to provide an event message includes backlighting the plurality of keys that include keys that include an alphabet in order to spell out an indication of the event.

18. The method of claim 15, further comprising:
determining, by the controller, a severity level of the event; and
activating, by the controller, the subset of the plurality of light emitting subsystems to indicate the severity level of the event.

19. The method of claim 18, further comprising:
activating, by the controller, the subset of the plurality of light emitting subsystems to emit a first color of light in response to determining a first severity level for the event; and
activating, by the controller, the subset of the plurality of light emitting subsystems to emit a second color of light in response to determining a second severity level for the event that is different than the first severity level.

20. The method of claim 15, further comprising:
activating, by the controller, a first subset of the plurality of light emitting subsystems according to the event messaging sequence defined by the event messaging information in order to backlight a first respective subset of the plurality of keys to provide a first portion of the event message;
receiving, by the controller, an input that requests more information about the event and, in response, activate a second subset of the plurality of light emitting subsystems according to the event messaging sequence defined by the event messaging information in order to backlight a second respective subset of the plurality of keys to provide a second portion of the event message.

* * * * *